United States Patent
Höglund et al.

[19]

[11] Patent Number: 5,987,745
[45] Date of Patent: *Nov. 23, 1999

[54] METHOD AND DEVICES FOR JOINTING CABLES

[75] Inventors: Mikael Höglund, Sjövik; Bert Johansson, Alingsås, both of Sweden

[73] Assignee: Kabeldon AB, Alingsas, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,073
[22] PCT Filed: Jun. 6, 1994
[86] PCT No.: PCT/SE94/00544
    § 371 Date: Dec. 4, 1995
    § 102(e) Date: Dec. 4, 1995
[87] PCT Pub. No.: WO94/29938
    PCT Pub. Date: Dec. 22, 1994

[30] Foreign Application Priority Data

Jun. 7, 1993 [SE] Sweden ................... 9301932

[51] Int. Cl.⁶ .................................................. H01R 43/00
[52] U.S. Cl. ................... 29/869; 29/868; 29/871
[58] Field of Search .................. 29/868, 869, 871, 29/872, 758, 512, 270, 235, 450; 174/84 R, 84 C

[56] References Cited

U.S. PATENT DOCUMENTS

| | | | |
|---|---|---|---|
| 2,405,399 | 8/1946 | Bugg et al. | 29/512 |
| 2,683,924 | 7/1954 | Schryver | 29/75 X |
| 3,010,194 | 11/1961 | Fratzke | 29/235 |
| 3,119,174 | 1/1964 | Wokeck | 29/450 |
| 4,391,661 | 7/1983 | Izraeli | 29/871 X |
| 4,416,059 | 11/1983 | Humphrey et al. | 29/758 X |
| 4,968,857 | 11/1990 | McGrane . | |
| 5,016,346 | 5/1991 | Gerst et al. | 29/450 X |
| 5,315,065 | 5/1994 | O'Donovan | 29/872 X |

FOREIGN PATENT DOCUMENTS 301158  of 1980  Germany .

*Primary Examiner*—Lee Young
*Assistant Examiner*—Bobby Rushing, Jr.
*Attorney, Agent, or Firm*—Pollock, Vande Sande & Amernick

[57] ABSTRACT

Electrical cables are joined end-to-end within an elongate, imperforate, expandable jointing body. A tubular-shaped mounting tool is inserted into an end of the jointing body and supports at its forward end a separable, forwardly tapered extension cone whose maximum outer diameter substantially corresponds to the desired expanded inner diameter of the jointing body. The mounting tool is inserted into the jointing body when the mounting tool is inserted into the jointing body. A handle rearwardly of the cone permits its removal from the jointing body but the jointing body itself maintains its position so as to maintain an expanded opening in the end of the jointing body. Thereafter, removal of the mounting tool seals the cable joint as a result of contraction of the cross-section area of the jointing body.

5 Claims, 4 Drawing Sheets

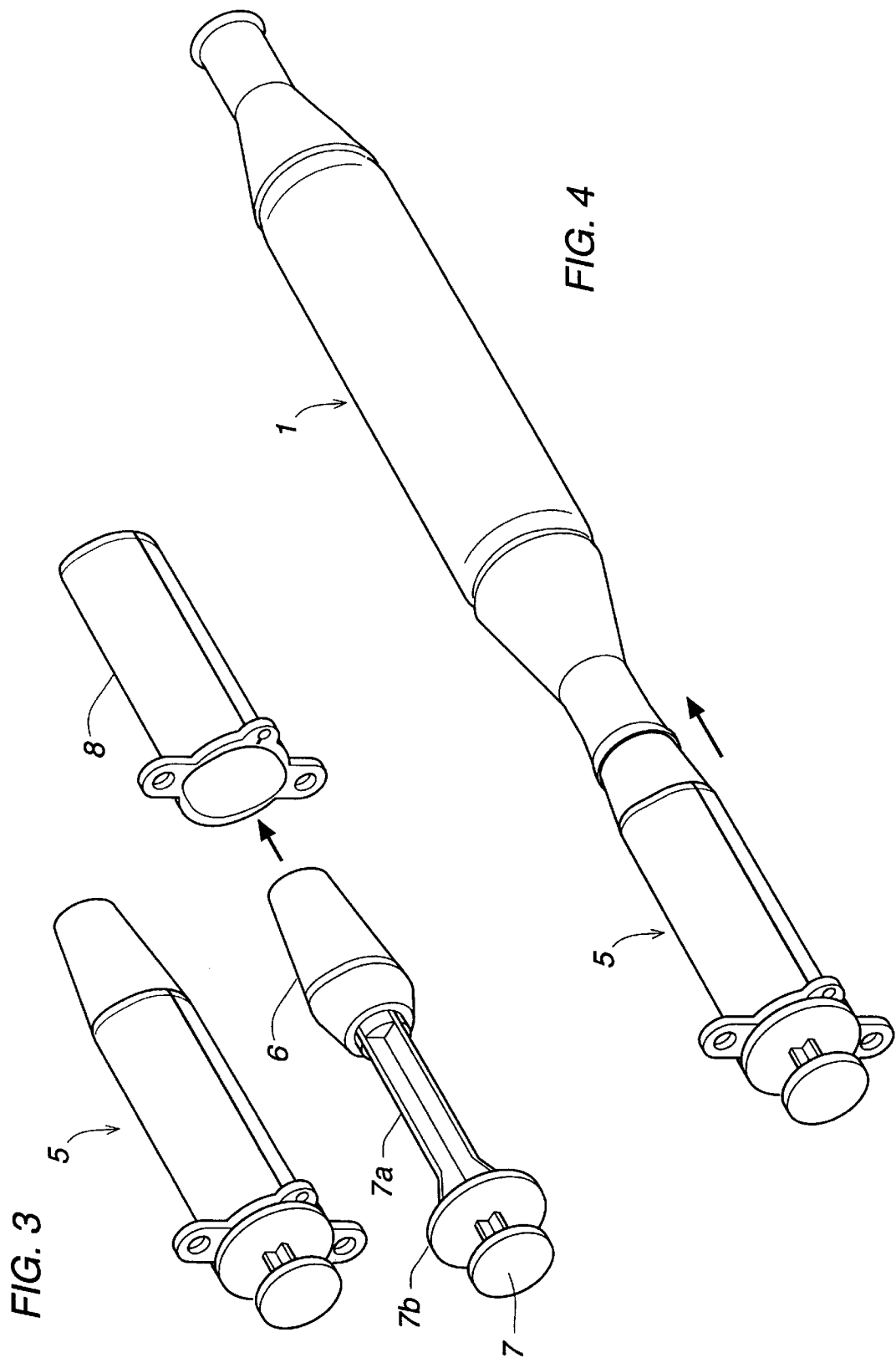

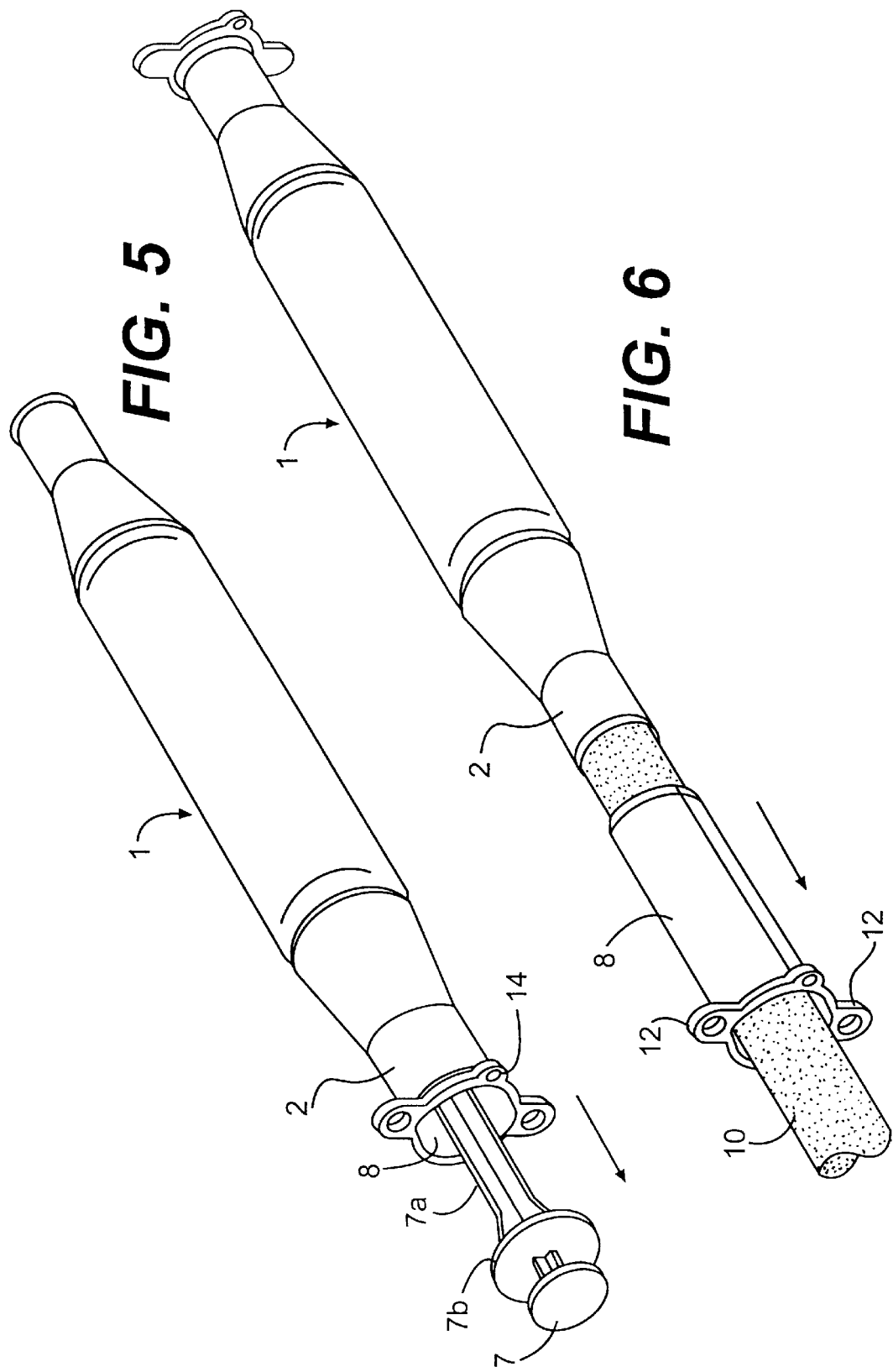

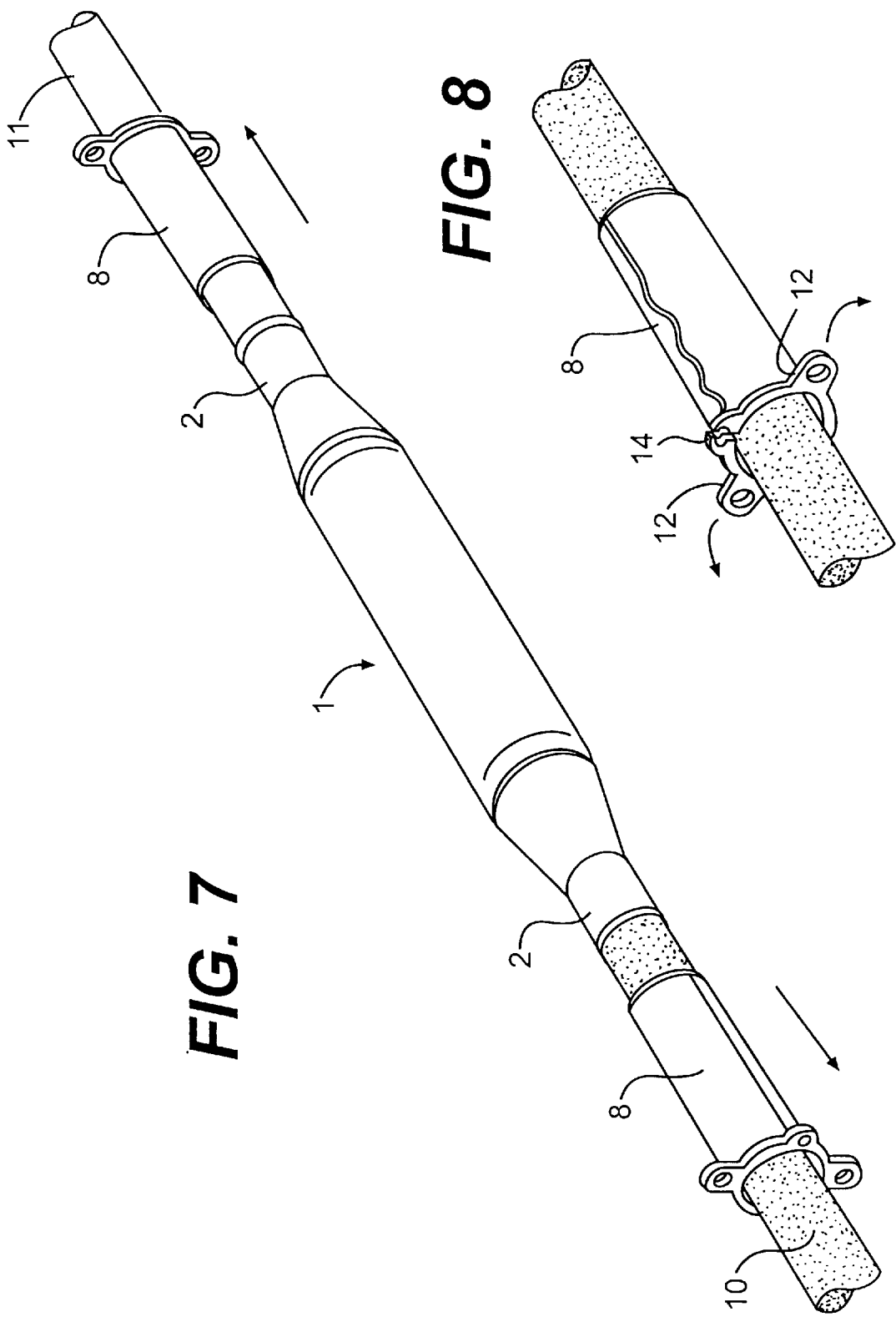

METHOD AND DEVICES FOR JOINTING CABLES

TECHNICAL FIELD

The present invention relates to a method and associated devices for jointing a power cable for medium voltage, that is, preferably a power cable intended for use in the voltage interval from 12 kV to 36 kV.

BACKGROUND OF THE INVENTION

When jointing a cable, the conductors of two cable ends are joined together by means of a connector, the respective cores having first been freed from the surrounding insulation. The joint with the exposed connector must then be insulated. This insulation is usually carried out by means of a prefabricated jointing body of rubber. Known jointing bodies are usually designed with substantially cylindrical shells. The jointing body itself is provided with a continuous cylindrical hole, wherein the hole in a natural, non-elongated state, has an inside diameter somewhat smaller than the outside diameter of the insulation on the cable which is to be joined. This is necessary for the elastic jointing body, after the jointing operation, to embrace the insulation of the cable ends in order to obtain a tightly fitting joint.

When a jointing operation is to be carried out, the work is initiated by moving the jointing body to a position of rest over one of the cable cores. The cable ends are prepared, which means exposure of the conductors to be joined and removal of the insulation screens, and the conductors are joined together. The jointing is usually carried out with a ferrule, which by mechanical deformation brings the ferrule into contact with the conductors. Afterwards, the jointing body is brought to a centered position over the joint. The connector sometimes has a larger diameter than the cores and can therefore constitute an obstacle to positioning the jointing body right across the joint.

Moving a jointing body over the exterior of a cable without expanding the jointing body in advance is difficult and means that the jointing body can only be used on a cable with a well-defined outside diameter adapted to the size of the jointing body. The tolerance range for variation of outside diameters of cables, for which a certain jointing body can be used, becomes very limited because a very considerable force is required to move the jointing body along the cable. Certain known jointing bodies must be expanded in order for the jointing body to be moved into position, partly over one of the cable cores prior to the work with jointing of the conductors, partly to be able afterwards to center the jointing body over the joint.

It is known to expand the jointing body from the factory on an inner carrier in the form of a thin pipe, which may be built up of a plastic tape which is wound into a pipe, the jointing body thus covering the plastic pipe like a cover. The jointing body with its carrier pipe has then been given an inside diameter which is larger than both the outside diameter on the cable to be joined and any connectors in the joint, whereby the jointing body can easily be fitted on the cable according to the above. After returning the jointing body over the joint, the expanding plastic pipe is removed by making the end or ends of the plastic tape, from which the pipe is formed, accessible and withdrawable from the interior of the jointing body, the jointing body thus collapsing and surrounding the joint. The disadvantage of this arrangement is that the jointing body will be expanded for a long time and then there is a risk that the rubber settles and possibly loses its re-sealing power, or that the storage time of the jointing body becomes limited. A further disadvantage is that the amount of material required to manufacture the carrier is considerable.

Another known jointing body is made as a cylindrical tube of rubber surrounded by a cylindrical shell of shrinking hose, to which the rubber tube is applied, whereby the rubber tube is kept stretched. The jointing body is applied over the joint, as described above, whereupon the rubber body surrounds the joint when the shrinking hose is heated, at which time the expanding forces of the shrinking hose are eliminated, whereby the re-sealing forces of the rubber tube around the cable cores and the joint are released. One of the disadvantages of this type of jointing is that heat must be supplied to the jointing body and further that the rubber component of the jointing body is expanded during the entire storage time of the jointing body.

The object of the present invention is to provide a jointing body which does not need to be expanded until being used, and to show that this can be achieved by means of a jointing method which utilizes an inexpensive and partially reusable mounting tool for expanding the jointing body.

SUMMARY OF THE INVENTION

The invention comprises a jointing body made of an elastic material for jointing two cable ends, wherein the jointing body is characterized in that its ends are each designed as end portions with a longitudinal hole re-sealing around the respective cable on each side of a joint, and that between these end portions there is an elongated, substantially cylindrical inner space with a cross-section area larger than the cross-section area of the holes of the end portions. Further, the invention comprises a mounting tool for applying the jointing body to the joint, wherein the mounting tool comprises a mounting pipe and an extension cone insertable therein, the mounting tool when jointing by means of the cone being primarily inserted into one end portion of the jointing body, whereby the end portion of the jointing body is expanded onto the mounting pipe, which has a larger inside diameter than the cable. This allows the jointing body to be easily fitted over the cable after the extension cone has been withdrawn from the mounting pipe. The same procedure is used for the other end portion of the jointing body which is expanded in the same way, allowing the entire jointing body to be easily fitted over one of the cable cores. After joining the conductors, the jointing body is centered over the joint, whereafter the mounting pipes are withdrawn from the respective end portions of the jointing body and removed, which results in the end portions re-sealing around the respective cable.

The advantage achieved through the invention is that, when the friction has been reduced, if necessary with the aid of a suitable lubricant, the jointing body can be expanded in a simple manner, on site, by means of the mounting tool. This becomes especially simple in the case, as described, where the jointing body has been enlarged in its inner part, since this inner part of the jointing body need not be expanded. However, it is possible to apply the technique described according to the invention also to jointing bodies with a completely straight cylindrical center hole by first inserting a mounting pipe into one end of the jointing body, the extension cone then being removed, and then inserting a mounting pipe from the other direction into the opposite end of the jointing body. When inserting the mounting tool into the second end of the jointing body, the extension cone can then partially penetrate into the mounting pipe which is inserted from the first end, the jointing body thus being expanded in its full length.

The reason that the end portions with their re-sealing inner holes have a limited extent in the longitudinal direction of the jointing body is the desire to minimize the forces which are required to expand the inner holes of the jointing body. This is simplified further by performing the expansion according to the invention from both ends of the jointing body.

The mounting pipe which, with the aid of the extension cone, is to be moved into position and expand an end portion of the jointing body is designed as a thin-walled tube, which can be cracked and thrown away after use. The tube can, of course, also be made in such a way as to enable it to be disassembled and reused after use.

When the jointing body has been moved into position over the joint, the mounting pipe can be withdrawn, as mentioned above. This mounting pipe may be provided with indications of fracture to facilitate cracking.

The cross-section area of the mounting pipe is circular, elliptical, or consists of a rhomboid with rounded corners.

The transition between mounting pipe and extension cone, when the cone is inserted into the pipe, is made such that a smooth transition is obtained.

The jointing body is made in a few sizes, where each size may cover a plurality of cable areas of cables with a certain system voltage, for example four different sizes for covering cable areas in the interval 50–630 mm$^2$. The mounting tool can be provided for each size of the jointing body; however, the same tool can be used also for jointing bodies which have been designed for cables with a different system voltage.

One advantage with jointing bodies according to the structure described is that the jointing bodies are characterized by a low weight. Another advantage of jointing according to the method described is that the jointing body described only has to be expanded for the period of time required to carry out the jointing operation.

Still another advantage of the jointing according to the invention is that two separate mounting pipes are used for expanding the jointing body. One mounting pipe is introduced into each end of the jointing body. This reduces the force necessary when introducing the pipe into the body and further the force necessary for withdrawing a pipe from the jointing body compared with the forces needed when using one mounting pipe extending along the whole length of the jointing body.

BRIEF DESCRIPTION OF THE DRAWINGS

FIG. 3 shows how the insertion of the extension cone into the mounting pipe forms the complete mounting tool.

FIG. 4 illustrates the expansion of one of the end portions of the jointing body by means of the mounting tool.

FIG. 5 shows the removal of the extension cone from the mounting pipe.

FIG. 6 illustrates the withdrawal of the mounting pipe from one end portion of the jointing body, this end portion then being re-sealed around the cable core.

FIG. 7 shows in a side view the removal of the mounting pipes away from the jointing body, a complete joint thus being formed.

FIG. 8 illustrates the removal of the mounting pipe from the cable.

DESCRIPTION OF THE PREFERRED EMBODIMENTS

The method and the associated devices according to the invention will be described in the following with reference to the accompanying drawings.

Figure 1:
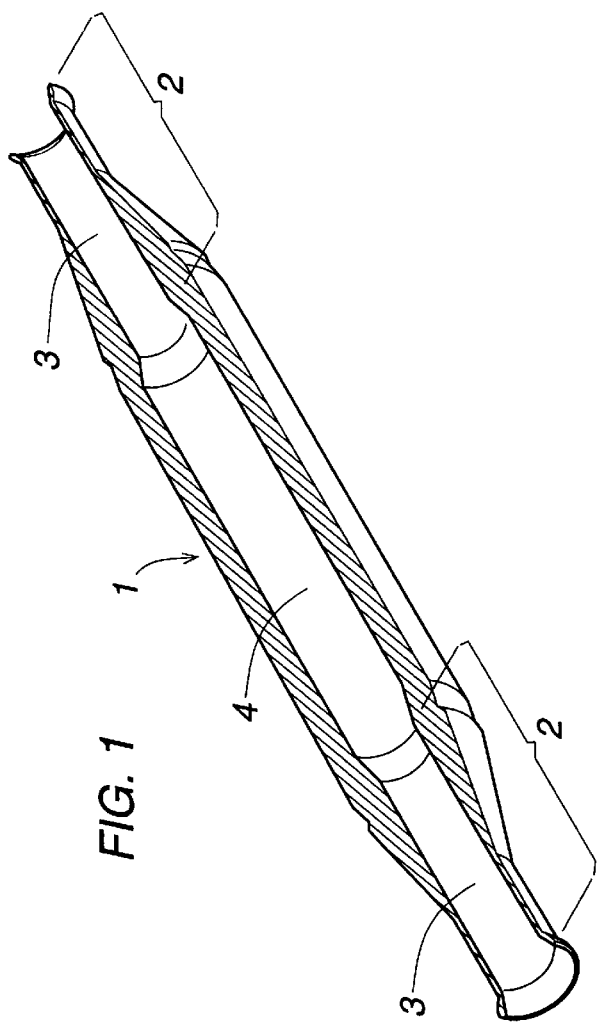
FIG. 1 shows a longitudinal section through a jointing body with an enlarged inner central portion and two sealing end portions according to the invention present.

The jointing body 1 is shown in FIG. 1 in a longitudinal section. As will be clear from the figure, the exterior of the jointing body according to the example assumes an almost cylindrical shape with conical transitions to cylindrical terminations at each end. The end portions 2 are illustrated as those portions of the jointing body 1 which have a cylindrical hole 3 with a cross-section area which is adapted to be somewhat smaller than the outer area of a prepared cable, around which the end portion is to re-seal tightly when the joint is completed. Between the two end portions 2 there is a central portion with an inner space 4, the inner space having a substantially elongated cylindrical shape. The cross-section area of this inner space 4 is larger than the cross-section area of the cylindrical holes 3 of the end portions. The cross-section area of the inner space 4 should be at least so large that the walls of the inner space 4 need not be expanded when the jointing body 1 is to be fitted over a cable core or be centered over a joint.

The jointing body 1 is suitably made of rubber, but other elastic materials can be utilized as well. The external layer of the jointing body as well as the internal surfaces of the substantially inner cylindrical space 4 consist of a flexible conducting layer to control the electric field at the joint in a known manner. The inner wall (envelope surface) of the inner space 4 can be made with a thin, conducting, elastic transverse wall or film, preferably arranged with a hole for the cable at the center, the task of this wall or film being to provide a conducting connection between the connector and the conducting inner layer of the inner space 4. As an alternative to a transverse wall, elastic conducting flaps or tongues can be used. Other alternatives include resilient wires or tongues. Common to these conducting means is that they may not constitute any obstacle to the insertion of a prepared cable into the jointing body.

Figure 2:
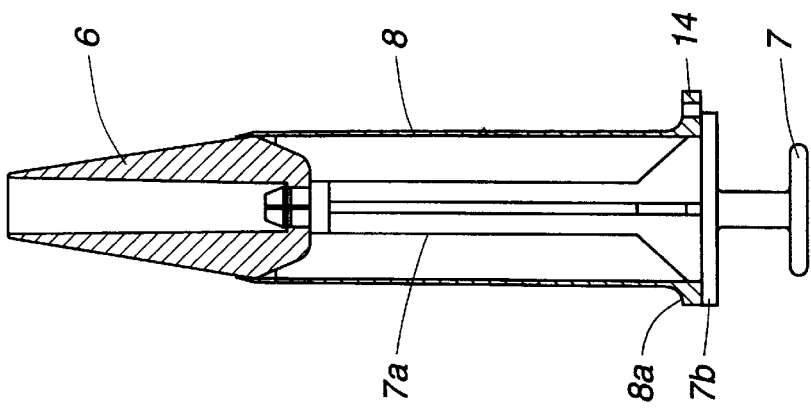
FIG. 2 illustrates the mounting tool with the mounting pipe and the extension cone.

The complete mounting tool to manufacture a joint with the aid of the jointing body 1 is shown in FIG. 2. The mounting tool 5 is, in principle, composed of two parts, namely, an extension cone (extension means) 6 with an associated handle 7 on a shaft 7a and the mounting pipe 8. FIG. 2 shows the extension cone 6 fully inserted into the mounting pipe 8.

According to the example shown, the extension cone 6 has the shape of a truncated cone and can thus have a square termination at the front end and has a diameter at its tip of such a magnitude as to allow it to be introduced into the cylindrical hole 3 at the end portion 2 of the jointing body 1. Other geometries of the extension means 6 with an expanding function according to the invention can, of course, also be used. When the mounting tool 5 is inserted into the end portion 2, the task of the extension cone 6 is to expand the hole 3 of the end portion to such an extent that the mounting tool 8 can be inserted fully into the end portion 2. At its widest part, the extension cone 6 forms an even, smooth transition towards the mounting pipe 8 due to the fact that the mounting pipe 8 is bevelled at the transition. The mounting pipe 8 is formed from a cylindrical tube with a thin shell, one end of which terminates in a flange 8a.

As shown in FIG. 3, the shaft 7a of the extension cone 6 is provided with a support 7b which, when joining the extension cone 6 and the mounting pipe 8 into a mounting tool 5, upon contact with the flange 8a of the mounting pipe, places the mounting pipe 8 in the correct position in relation to the extension cone 6, such that the described transition between the pipe and the cone is smooth.

In the jointing process, the extension cone 6 is inserted into the mounting pipe 8, whereupon the complete mounting tool 5, lubricated, is inserted into the end portion 2 for jointing body (see FIGS. 4 and 5). This causes this end portion 2 to be expanded onto the mounting pipe 8 such that the area of the cylindrical hole 3 of the end portion 2 is equal to the outer area of the mounting pipe 8. By gripping around the handle 7, the extension cone 6 can now be withdrawn and removed from the mounting pipe 8 (FIG. 5) which remains in the end portion 2 and keeps this portion expanded. The same procedure is used for the other end portion 2 of the jointing body 1, such that this end portion also becomes expanded onto another mounting pipe 3. Thus, when both end portions 2 are expanded, the jointing body 1 can be fitted over one of the cable cores 10. The actual jointing of the conductors of the cable is carried out in a known manner, for example with the aid of a connector or by means of other methods.

When both cables 10 and 11 are joined, the jointing body 1 is returned by moving it along the cable and centering it over the joint. Since the jointing body 1 is kept expanded by the mounting pipe 8, this causes no problems since the inside diameter of the mounting pipes 8 is larger than the diameter of the connector. In addition, the enlarged inner space 4 provides space for the connector.

When the jointing body 1 is centered over the joint, the mounting pipe 8 is withdrawn from the jointing body 1 (see FIGS. 6 and 7), whereby the end portions 2 recover their original shape and tightly surround the two cables 10 and 11 on both sides of the joint. The withdrawal from the mounting pipes 8 is facilitated by providing these with wings 12 at a flange 8a on the mounting pipe 8 which remains outside the jointing body 1. The wings 12 are utilized as handles when withdrawing the mounting pipe 8 from the end portion 2.

When the mounting pipes 8 are withdrawn, they are removed from the cable by splitting them at a notch 14, the pipes 8 then being broken apart with the aid of the wings 12 and being removed from the cable. The joint with the jointing body is then covered in a known manner in order to protect the joint from mechanical or other damage.

The mounting pipe 8 can be provided with longitudinal indications of fracture or be dividable, allowing the mounting pipe to be removed from the cable and be reused. In the simplest case, the mounting pipe 8 is in the form of a stiff and thin plastic material, the mounting pipe 8 thus forming a disposable article.

The mounting pipes 8 and the described process can be utilized also with jointing bodies which have a continuous cylindrical hole, which is to be extended in its entirety. The disadvantage of this is that considerably greater forces must be used to extend the inner hole of the jointing body.

The mounting pipe 8 is intentionally described as cylindrical in order thus to comprise all types of cylinders, in which a section through the envelope surface of the cylinder shows a closed curve. The mounting pipe 8 can thus possess shapes which are adapted to cables with different geometries of their cross-sectional area.

What is claimed is:

1. A method for insulating a joint between two cables, comprising the steps of:

forming a tubular jointing body having two ends each having an elastically expandable end portion with an inner circumference smaller than the outer periphery of the cables to be jointed;

inserting a separate mounting tool into each of said end portions whereby said end portions are expanded onto an outer surface of said mounting tool and wherein a passageway is formed through said jointing body and said mounting tools, said passageway having an inner dimension greater than the outer periphery of the cables to be jointed;

slipping said jointing body, with said mounting tools inserted in each end portion, onto one of the cables to be jointed;

jointing said cables together;

centering said jointing body over the joint; and removing from each of said end portions said mounting tool, whereby said end portions contract by reason of their elasticity, so as to be securely fitted about the cables.

2. A method for jointing two power cables according to claim 1, wherein said mounting tool comprises a mounting pipe and an extension cone and wherein said step of inserting further comprises the steps of:

expanding each of said end portions radially by inserting said extension cone therein;

sliding said end portions onto the outside of said mounting pipe as said extension cone is inserted into said end portions, whereby said end portions are expanded onto an outer surface of said mounting pipe; and completely removing said extension cone from said mounting pipe and said jointing body whereby said passageway having an inner dimension greater than the outer periphery of the cables to be jointed is formed through said jointing body and said mounting pipe.

3. A method for jointing two power cables according to claim 2, wherein said removing of said extension cone is achieved by pulling said extension cone rearwardly out of said mounting pipe.

4. A method for jointing two power cables according to claim 2, further comprising the step of lubricating said mounting tool prior to insertion into each of said end portions.

5. A method for jointing two power cables according to claim 1, wherein said step of removing said mounting pipe from each of said end portions is achieved by pulling said mounting pipe rearwardly out of said end portion and thereafter splitting said mounting pipe and removing it from the jointed cabled.

* * * * *